(12) United States Patent
Lim et al.

(10) Patent No.: US 6,724,550 B2
(45) Date of Patent: Apr. 20, 2004

(54) ADAPTIVE DAMPENING OF THERMAL ASPERITY EVENTS IN DISC DRIVES

(75) Inventors: Eng Hock Lim, Singapore (SG); Beng Theam Ko, Singapore (SG); Hweepeng Teo, Singapore (SG); Fong Kheon Chong, Singapore (SG); Myint Ngwe, Singapore (SG); Kah Liang Gan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 378 days.

(21) Appl. No.: 09/955,621

(22) Filed: Sep. 19, 2001

(65) Prior Publication Data

US 2002/0126403 A1 Sep. 12, 2002

Related U.S. Application Data

(60) Provisional application No. 60/263,622, filed on Jan. 23, 2001.

(51) Int. Cl.$^7$ ................................................. G11B 5/02
(52) U.S. Cl. .......................... 360/25; 360/31; 360/46; 360/53; 360/67
(58) Field of Search ............................ 360/46, 53, 67, 360/25, 31

(56) References Cited

U.S. PATENT DOCUMENTS

| | | |
|---|---|---|
| 4,669,004 A | 5/1987 | Moon et al. |
| 4,783,705 A | 11/1988 | Moon et al. |
| 5,412,519 A | 5/1995 | Buettner et al. |
| 5,715,110 A | 2/1998 | Nishiyama et al. |
| 5,739,972 A | 4/1998 | Smith et al. |
| 5,844,920 A | 12/1998 | Zook et al. |
| 5,852,524 A | 12/1998 | Glover et al. |
| 5,870,241 A | 2/1999 | Ottesen et al. |
| 5,872,676 A | 2/1999 | Smith et al. |
| 5,880,901 A | 3/1999 | Smith et al. |
| 5,901,010 A | 5/1999 | Glover et al. |
| 5,995,313 A | 11/1999 | Dakroub |
| 6,005,726 A | 12/1999 | Tsunoda |
| 6,101,054 A | 8/2000 | Tsunoda |
| 6,104,557 A | 8/2000 | Kasai et al. |
| 6,130,793 A | 10/2000 | Ohmori et al. |
| 6,175,457 B1 | 1/2001 | Flynn |
| 6,219,192 B1 | 4/2001 | Gopalaswamy et al. |
| 6,226,136 B1 * | 5/2001 | Chern .................. 360/25 |
| 6,255,898 B1 | 7/2001 | Ono et al. |
| 6,359,743 B1 * | 3/2002 | Patti et al. ............ 360/25 |

FOREIGN PATENT DOCUMENTS

| | | | | |
|---|---|---|---|---|
| FR | 2745666 A1 | * | 9/1997 | ........... H03G/3/30 |
| JP | 11096510 A | * | 4/1999 | ........... G11B/5/09 |

* cited by examiner

*Primary Examiner*—David Hudspeth
*Assistant Examiner*—Rocio Colon
(74) *Attorney, Agent, or Firm*—Fellers, Snider, et al.

(57) ABSTRACT

A method for the adaptive dampening of a peak amplitude of a thermal asperity signal in a disc drive to minimize loss of read data integrity, including the steps of determining a peak-to-peak preamble signal amplitude for identifying an amplitude signal range of the peak amplitude of the thermal asperity signal; measuring the peak amplitude of the thermal asperity signal; separating the peak-to-peak preamble signal amplitude into substantially even portions for use in calculating a value of the amplitude signal range of the peak amplitude of the thermal asperity signal; calculating the value of the amplitude signal range of the peak amplitude of the thermal asperity signal for use in determining a dampening resistance used by a dampening circuit to adaptively dampen the peak amplitude of the thermal asperity signal; and activating the dampening circuit to dampen the peak amplitude of the thermal asperity signal.

15 Claims, 4 Drawing Sheets

ADAPTIVE DAMPENING OF THERMAL ASPERITY EVENTS IN DISC DRIVES

RELATED APPLICATIONS

This application claims priority to U.S. Provisional Application No. 60/263,622 filed Jan. 23, 2001, entitled Adaptive Damping Factor In The Thermal Asperity Event of Hard Disc Drives.

FIELD OF THE INVENTION

This invention relates generally to the field of data storage devices, and more particularly, but not by way of limitation, to adaptive dampening of thermal asperity events for disc drive.

BACKGROUND

Disc drives are used for data storage in modem electronic products ranging from digital cameras to computer systems and networks. Typically, a disc drive includes a mechanical portion, or head disc assembly (HDA), and electronics in the form of a printed circuit board assembly (PCB) mounted to an outer surface of the head disc assembly. The printed circuit board assembly (PCB) controls head disc assembly functions and interfaces between the disc drive and its host.

Generally, the head disc assembly includes one or more magnetic discs affixed to a spindle motor assembly for rotation at a constant speed; an actuator assembly supporting an array of read/write heads that traverse generally concentric data tracks radially spaced across the disc surfaces; and a voice coil motor (VCM) providing rotational motion to the actuator assembly. With the advent of magneto-resistive head technology, continued demand for disc drives with improved reliability and overall operating efficiencies has caused disc drive manufacturers to seek ways to increase the tolerance of disc drives to thermal asperity events as well as to reduce the effects of thermal asperity events during data transfer functions.

To ensure data is correctly read from a track of the magnetic media in a disc drive, the read/write head should be kept centered on the recording track while maintaining a desired fly height. A collision of the read/write head with foreign objects on the disc media can cause a large shift in the baseline of the preamplifier output, due to a temperature rise of the magneto-resistive head. An occurrence of such an event is referred to in the art as a thermal asperity (TA) event. An amplitude spike in the readback signal is the result or symptom associated with the thermal asperity event, which can cause serious corruption or loss of data during a read function of the disc drive.

Thermal asperity detection is accomplished by sensing the baseline of the signal using both a low-pass filter and a zero-crossing detector. Reducing the effects of the thermal asperity on readback data relies on a pre-set switching dampening factor, carried out by an AC dampening circuitry. However, the specific dampening value of the pre-set switching dampening factor is not always the best value and may cause under dampening and over dampening.

Under dampening the amplitude spike of the thermal asperity event extends the time period for regaining a lock on the readback signal. The thermal asperity causes a read channel of the disc drive to undertake a task of adjusting an automatic gain control circuit (AGC) in preparation for reading data at a higher amplitude. However, when the data following the amplitude spike enters the channel it is at an amplitude below the level set by the AGC and the channel is unable to read the data. This inability to read the data causes the read channel to reset the AGC back to the baseline where, once again, the data can be read.

Over dampening, or reducing the amplitude of the read back to a value below the baseline, results in adjustments to the AGC in preparation for receipt of data at an amplitude below the baseline. However, the data following the thermal asperity event is at the baseline amplitude, an amplitude above the threshold set in the AGC, which causes a loss in data for the period of time that it takes the read channel to readjust the AGC back to a setting consistent with the read data baseline.

Therefore, challenges remain and a need persists for a techniques and an apparatus for adaptive dampening a thermal asperity event during read operations of a disc drive. It is to this and other features and advantages set forth herein that embodiments of the present invention are directed.

SUMMARY OF THE INVENTION

The present invention provides a method for adaptively dampening a peak amplitude of a thermal asperity signal in a disc drive to minimize the loss of read data integrity during read operations. The method for adaptively dampening the peak amplitude of the thermal asperity includes the steps of determining peak-to-peak preamble signal amplitude for identifying an amplitude signal range of the peak amplitude of the thermal asperity signal; measuring the peak amplitude of the thermal asperity signal; separating the peak-to-peak preamble signal amplitude into substantially even portions for use in calculating a value of the amplitude signal range of the peak amplitude of the thermal asperity signal; calculating the value of the amplitude signal range of the peak amplitude of the thermal asperity signal for use in determining a dampening resistance used by a dampening circuit to adaptively dampen the peak amplitude of the thermal asperity signal; and activating the dampening circuit to dampen (also sometimes herein dampen down) the peak amplitude of the thermal asperity signal.

The present invention further provides a disc drive having a basedeck supporting a spindle motor assembly with a rotatable disc surface accessed by at least one magneto-resistive read/write head positionably adjacent the rotatable disc surface. A printed circuit board assembly secured to the basedeck is provided with a read/write channel communicating with the magneto-resistive read/write head through a preamplifier; the printed circuit board having a variable gain amplifier communicating with the preamplifier adjusting a signal provided by the magneto-resistive read/write head; a dampening capacitor in parallel with the variable gain amplifier for filtering the signal provided by the magneto-resistive read/write head; and an n-channel enhancement MOSFET in parallel with the dampening capacitor to provide a dampening resistance for dampening the signal provided by the magneto-resistive read/write head.

These and various other features and advantages, which characterize embodiments of the present invention, will be apparent from a reading of the following detailed description and a review of the associated drawings.

DETAILED DESCRIPTION

Figure 1:
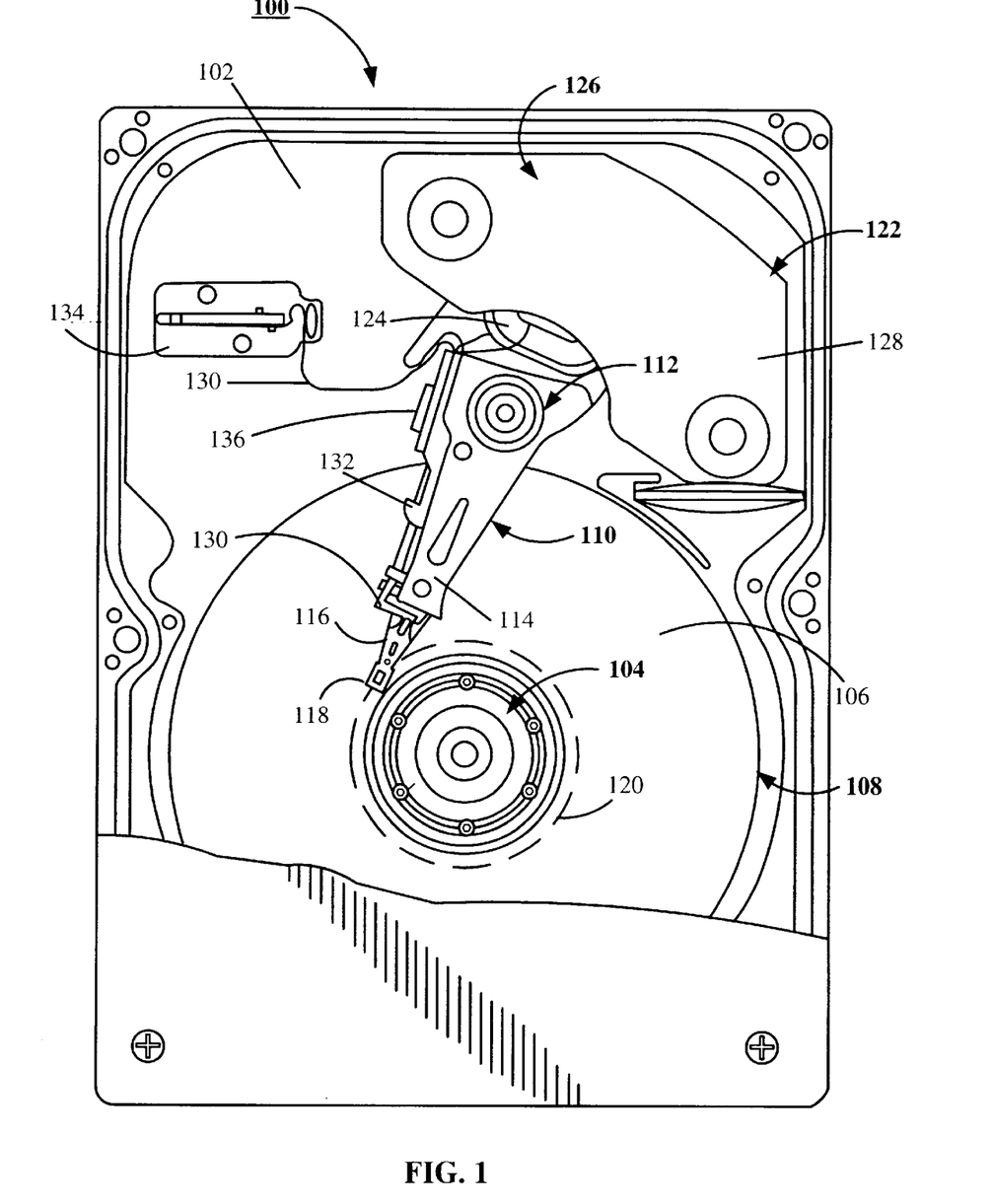
FIG. 1 is a top plan view of a partially cutaway disc drive incorporating hardware programmed with software for adaptive dampening thermal asperity events in accordance with embodiments of the present invention.

Referring to the drawings in general, and more particularly to FIG. 1, shown therein is a top view of a disc drive 100 constructed in accordance with an embodiment of the present invention. Numerous details of and variations for the construction of the disc drive 100 are not included in the following description as such are well-known to those skilled in the art and are believed to be unnecessary for the purpose of describing embodiments of the present invention.

The disc drive 100 includes a basedeck 102 supporting various disc drive components, including a spindle motor assembly 104. The spindle motor assembly 104 supports an axially aligned rotatable disc surface 106 forming a disc stack 108, also referred to as a disc pack. Adjacent the disc stack 108 is an actuator assembly 110 (also referred to as an E-block or a head stack assembly, HSA), which rotationally pivots about a primary actuator motor support, or bearing assembly, 112. The head stack assembly 110 includes an actuator arm 114 that supports a load arm 116 that in turn supports a magneto resistive (MR) read/write head 118 adjacent the rotatable disc surface 106. The rotatable disc surface 106 is divided into concentric data tracks 120 (only one depicted) over which the read/write head 118 is positionably located, and on which head position control information are written to embedded servo sectors (not separately depicted). The embedded servo sectors separate a plurality of data sectors (not separately depicted) used for storing data.

The term "servoing," also referred to as position-controlling, as used herein means maintaining control of the read/write head 118 relative to the rotating disc surfaces 106 during operation of the disc drive 100. When servoing to or on data track 120, the head stack assembly 110 is controllably positioned by a primary actuator motor 122 (also referred to herein as a voice coil motor assembly, VCM). The voice coil motor assembly includes an actuator coil 124 immersed in the magnetic field generated by a magnet assembly 126. A magnetically permeable flux path is provided by a pair of steel plates 128, also referred to as pole pieces, mounted above and below the actuator coil 124 to complete a magnetic circuit of the voice coil motor 122.

To provide the requisite electrical conduction paths between the read/write head 118 and disc drive read/write circuitry (not shown), read/write head conductors (not separately shown) are affixed to a read/write flex circuit 130. The read/write flex circuit 130 is routed from the load arms 116 along the actuator arms 114 into a flex circuit containment channel 132, and then to a flex connector body 134. The flex connector body 134 supports the read/write flex circuit 130 during passage of the read/write flex circuit 130 through the basedeck 102 and into communication with a disc drive printed circuit board assembly (PCBA, not shown) mounted to the underside of the basedeck 102. The read/write flex circuit 130 also supports read/write signal circuitry, including preamplifier/driver (preamp) 136 used to condition read/write signals passed between the read/write circuitry (not shown) and the read/write head 118. The printed circuit board assembly supports the read/write circuitry, also known as a read/write channel (not shown) that controls the operation of the head 118. The printed circuit board assembly also supports interface and control circuitry for the disc drive 100 along with a thermal asperity dampening circuit (not separately shown) for use in dampening a thermal asperity, or TA, signal resulting from a thermal asperity event experienced by the disc drive 100 while executing a data read function.

Figure 2:
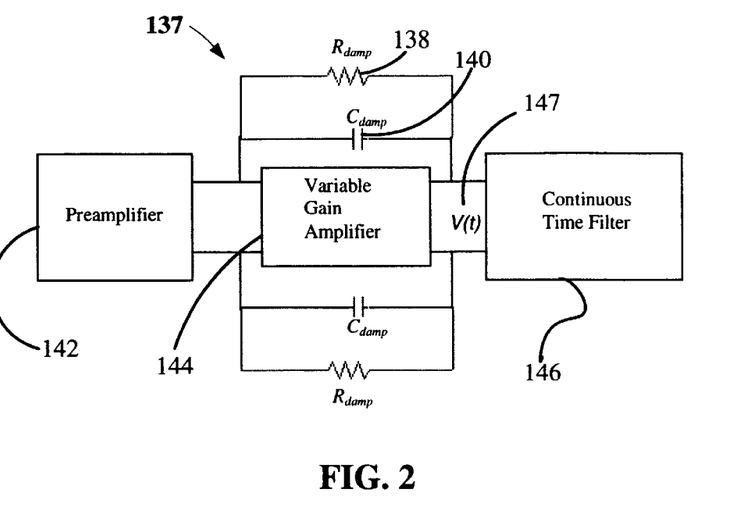
FIG. 2 is a thermal asperity compensation circuit of the disc drive of FIG. 1.

FIG. 2 shows a dampening circuit 137 for providing a dampening factor to dampen a peak amplitude of the thermal asperity signal that results when the disc drive 100 encounters a thermal asperity. The dampening circuit 137 has at least one dampening resistance ($R_{damp}$) 138, at least one dampening capacitance ($C_{damp}$) 140 along with a preamplifier 142, a variable gain amplifier 144 and a continuous time filter 146. In order to dampen the TA signal more effectively, an adaptive dampening factor is calculated from the resistance $R_{damp}$ 138 and capacitance $C_{damp}$ 140. For the ease of implementation, the adaptive dampening circuit 137 is implemented by varying $R_{damp}$ 138 while holding $C_{damp}$ 140 fixed.

In a preferred embodiment, a method for adaptively dampening the TA signal, a TA peak amplitude value is used to determine $R_{damp}$ 138. Alternatively, the TA signal can be damped in a similar way by varying the $C_{damp}$ 140 while holding the $R_{damp}$ 138 fixed.

Figure 3:
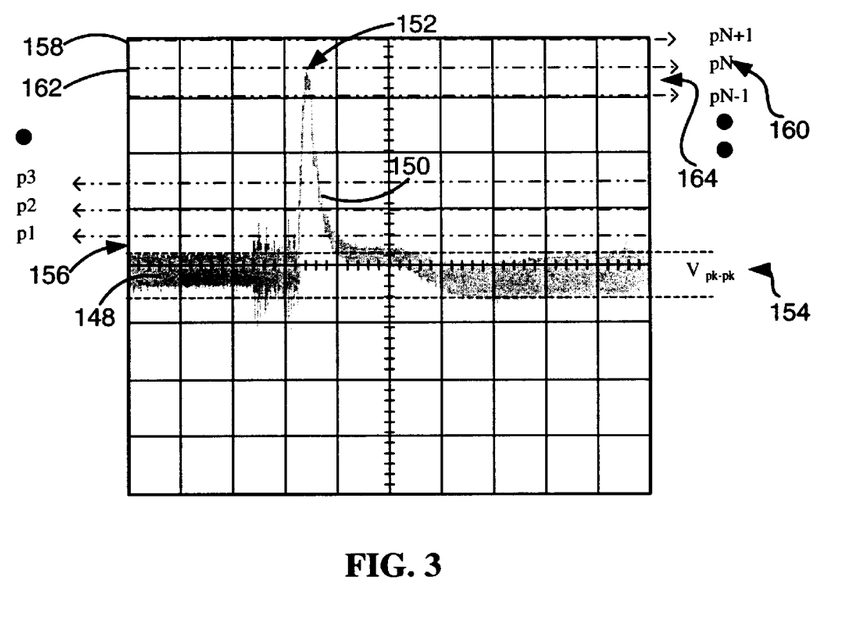
FIG. 3 is a trace of a read back signal including a thermal asperity signal resulting from a thermal asperity event experienced by the disc drive of FIG. 1.

FIG. 3 shows a trace of a read signal 148 of the magneto resistive read/write head 118 (FIG. 1), reading data from a rotatable disc surface 106 that includes a thermal asperity, or TA, signal 150 with a thermal asperity, or TA, peak amplitude value ($V_{TA\ max}$) 152. In a preferred embodiment for adaptively dampening down the TA signal 150, a peak-to-peak signal amplitude ($V_{pk-pk}$) 154 of an isolation pulse or preamble is first calculated and the result evenly divided into M portions (M=1,2,3, . . .) that are used to define a series of portions 156 (p1 through pN+1). The width of each portion 156 is applied to the entire TA signal 150 range. The voltage magnitude of each portion 156 is calculated by equation (1). If there is any DC offset for the non-TA signal, it is then necessary to add the offset to equation (1).

$$V_{pN} = \frac{V_{pk-pk}}{M}N + \frac{V_{pk-pk}}{2} \quad (N = 1, 2, 3, \ldots) \tag{1}$$

A baseline (not shown separately) of the TA signal 150 is then detected and the TA peak amplitude value ($V_{TA\ max}$) 152 is determined. It is observed that the TA peak amplitude value ($V_{TA\ max}$) 152 is located in between the interval pN−1 & pN. As an example, if a TA peak amplitude value ($V_{TA\ max}$) 152 is determined to have a value of 325 mV, a peak-to-peak signal amplitude ($V_{pk-pk}$) 154 of the preamble at 100 mV and M=2, the value of each portion 156 as calculated will be 50 mV. The voltage of each portion 156 is calculated from equation (1) as $V_{p1}$=100 mV, $V_{p2}$=150 mV, $V_{p3}$=200 mV, $V_{p4}$=250 mV, $V_{p5}$=300 mV, and $V_{p6}$=350 mV.

Returning to FIG. 2, behavior of a voltage signal V(t) 147 of the dampening circuitry 137, which is generally used to dampen the TA signal 150 (of FIG. 3), is given by equation (2) as follows:

$$V(t) = V_{TA,\max} e^{-\frac{t}{R_{damp} C_{damp}}}, \quad (2)$$

where t is the time.

It is observed that the dampening rate (decay rate) of V (t) is inversely proportional to $R_{damp}$ 138 and $C_{damp}$ 140. A smaller $R_{damp}$ 138 and $C_{damp}$ 140 product results in faster dampening. To get a fixed V(t) at a certain time, it is observed that higher TA peak amplitude value $V_{TA\ max}$ 152 (of FIG. 3) needs a smaller $R_{damp}$ 138-$C_{damp}$ 140 product value.

Referring again to FIG. 3, by knowing that $V_{TA\ max}$ 152 is located in the interval between pN−1 & pN, and fixing the capacitance $C_{damp}$ 140 (of FIG. 2), a voltage value $V_{pN}$ 158 of pN portion 160, or a voltage value $V_{pN-1}$ 162 of pN−1 164, as determined by equation (1), is used to determine the resistance $R_{damp}$ 138. In the given example, the $V_{p6}$=350 mV is used to determine the value of the resistance of $R_{damp}$ 138 through the use of the following equation (3):

$$R_{damp} = \frac{B}{V_{pN}}, \quad (3)$$

where B is a constant.

For ease of implementation, the slew rate of the TA signal is assumed to be linear in equation (3); otherwise, a logarithmic factor is required. In equation (3), it is observed that higher $V_{pN}$ needs a smaller dampening resistance value to "dampen" the TA signal 150. A similar process is applied to derive $$C_{damp} = \frac{B}{V_{pN}}.$$

The constant B is determined empirically through the data collection from experiments for a family of disc drives of which the disc drive 100 (FIG. 1) is a member. In a preferred embodiment, the relationship between $R_{damp}$ and $V_{pN}$ is tabulated and stored in a memory of the PCB of the disc drive 100.

Figure 4:
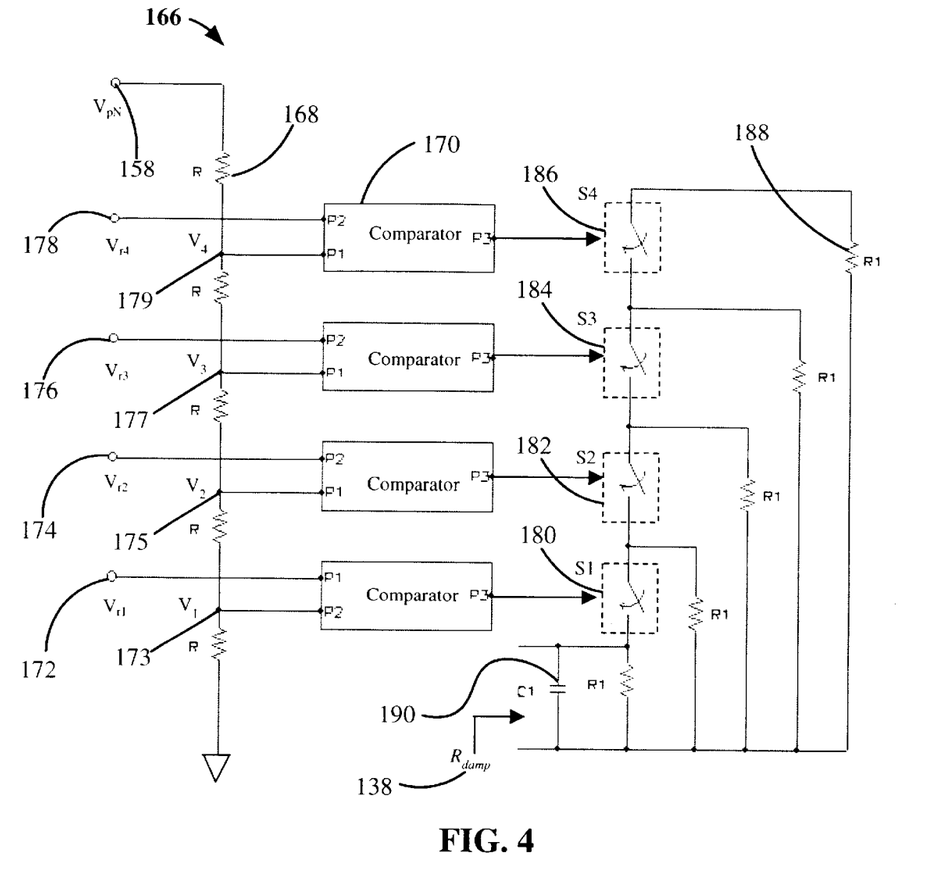
FIG. 4 is an adaptive dampening resistance circuit in a discreet component form used by the thermal asperity compensation circuit of FIG. 2.

FIG. 4 shows an implementation embodiment of a dampening resistance circuit 166 in a discrete component-form. Either the voltage value $V_{pN}$ 158 of pN portion 160 (of FIG. 3), or the voltage value $V_{pN-1}$ 162 of pN−1 164 (of FIG. 3) is applied to 4 resistors (R) 168 connected serially at one end of 4 comparators 170. For clarity of disclosure, the value VPN 158 (of FIG. 3) is selected for this discussion. Upon the application of VPN 158 to the adaptive dampening resistance circuit 166, the VPN 158 is divided equally at each node of the resistors R 168. Reference voltages $Vr_1$ 172, $Vr_2$ 174, $Vr_3$ 176 and $Vr_4$ 178 are each empirically determined for each disc drive type 100 (of FIG. 1). The reference voltage values are set so that $Vr_4 > Vr_3 > Vr_2 > Vr_1$, and these values are used by the comparators 170 to compare against an equal portion of the value of the $V_{pN}$ 158 present at each node of the resistor 168 associated with a particular comparator 170, i.e., $V_1$ 173, $V_2$ 175, $V_3$ 177 and $V_4$ 179 where $V_4 = V_3 = V_2 = Vr_1$.

Upon a determination by each of the comparators 170 that the portion of the value of the $V_{pN}$ 158 present at the node of the resistor 168 associated with that particular comparator 170 is greater than the reference voltage associated therewith, each such particular comparator 170 turns on an associated switch, $S_1$ 180, $S_2$ 182, $S_3$ 184 or $S_4$ 186. Each of the switches $S_1$ 180, $S_2$ 182, $S_3$ 184 and $S_4$ 186 is turned on consecutively to engage an associated resistor (R1) 188. For example, $S_1$ 180 and $S_2$ 182 are turned on if $V_2$ is greater than $Vr_2$ 174, while $S_3$ 184 and $S_4$ 186 are turned off.

The dampening resistance value can be calculated from the equation $$R_{damp} = \frac{R1}{2^k},$$

where k=1,2,3,4 (k is the number of turn-on switches). Better resolution is available by increasing the value of k, or the number of components. The notation $C_1$ 190 equals $C_{damp}$. A larger $V_{pN}$ 158 causes more switches to be turned on, which provides a smaller $R_{damp}$ 138.

Figure 5:
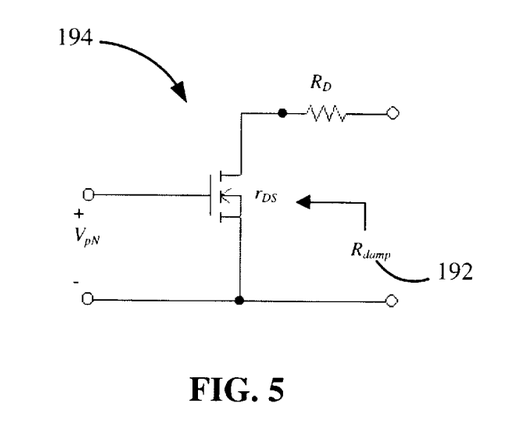
FIG. 5 is an adaptive dampening resistance circuit in an analogue form used by the thermal asperity compensation circuit of FIG. 2.

In an alternative preferred embodiment, as shown in FIG. 5, an adaptive dampening resistance $R_{damp}$ 192 can be implemented in an analogue form by using an n-channel enhancement MOSFET 194. The $r_{DS}$ of the MOSFET 194 can be calculated from equation (4) as follows:

$$R_{damp} = r_{DS} = \left[k_n' \frac{W}{L}(V_{pN} - V_t)\right]^{-1}, \quad (4)$$

where $k_n'$ is the process transconductance parameter, L is the channel length, W is the channel width, and Vt is the threshold voltage of the MOSFET. The values are available in most of the semiconductor textbooks.

As shown by equation (4), a larger $V_{pN}$ 158 results in a smaller adaptive dampening resistance $R_{damp}$ 192. The response time of the MOSFET embodiment is sufficiently fast to be implemented on the fly to compensate for the TA signal 150 (FIG. 3). By using the adaptive dampening resistance $R_{damp}$ 192, the TA signal 150 of a thermal asperity event can be dampened effectively based on the TA peak amplitude value $V_{TA\ max}$ 152.

Figure 6:
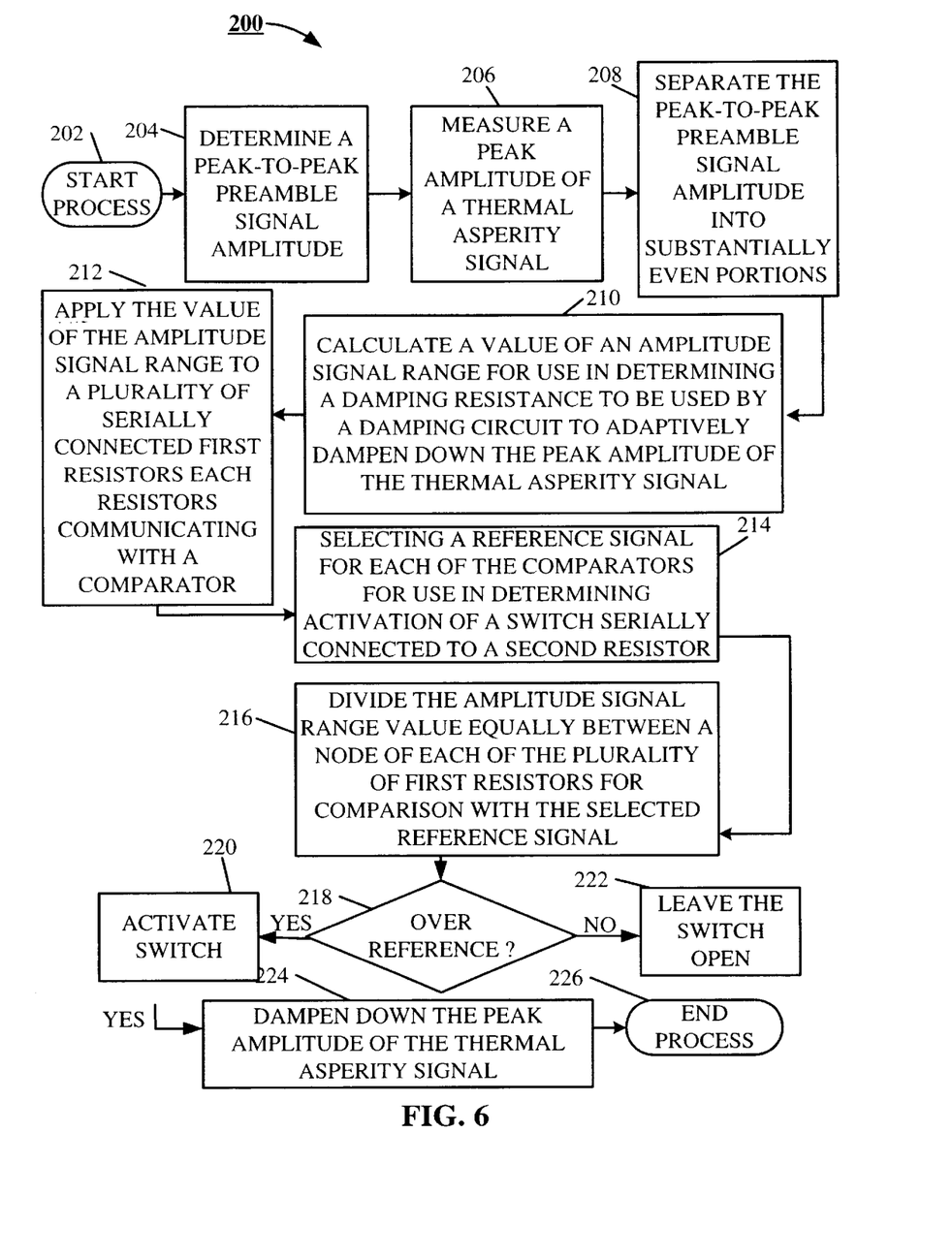
FIG. 6 is a flow diagram for adaptively dampening the thermal asperity signal of FIG. 3.

FIG. 6 is a flow diagram for adaptive dampening of a peak amplitude of a thermal asperity signal dampening process 200, the method steps depicted therein used to minimize a loss of a read data integrity for a signal provided by a magneto-resistive read/write head (such as 118) reading data from a rotatable disc surface (such as 106) of a disc drive (such as 100). The dampening process 200 starts at start process step 202 and continues to process step 204 whereat a peak-to-peak isolation pulse or preamble signal amplitude ($V_{pk-pk}$) (such as 154) is measured for the use of identifying an amplitude signal range value (such as 156) that a peak amplitude of a thermal asperity signal (such as 152) is measured to be within.

With the $V_{pk-pk}$ identified, the process continues at process step 206 whereat the peak amplitude of the thermal asperity signal to be dampened is measured. Next, the process continues at process step 208 whereat the $V_{pk-pk}$ is divided into substantially even portions for use in calculating a voltage value (such as $V_{pN}$ 158) for the amplitude signal range (such as pN portion 160) that the peak amplitude of the thermal asperity signal is determined to be within. At process step 210, the voltage value for the amplitude signal range that the peak amplitude of the thermal asperity signal is determined to be within is calculated for use in determining a dampening resistance (such as $R_{damp}$ 138) for use by a dampening circuit (such as 136).

Continuing with the dampening process 200, the voltage value for the amplitude signal range is applied to a plurality of serially connected first resistors (such as 168) at process step 212. In process step 214 a plurality of distinct reference voltages or reference signals (such as 172) are selected for use by a plurality of associated comparators (such as 170) to determine activation of a switch (such as 180). Each switch communicates with a resistor (such as 188) in serial communication with the switch. Activation of the switch allows the resistor associated with the activated switch to contribute to the dampening resistance of a dampening resistance circuit (such as 166).

At process step 216, the amplitude signal range value is divided equally between a node of each of the plurality of first resistors for use by each of the comparators associated with each of the plurality of first resistors. Each comparator compares the value of the portion of the amplitude signal range voltage present at the node of the resistor associative with the comparator, the selected reference voltage associated with each particular comparator determining the activation status of the switch associated therewith.

At process step 218, a decision point, if the portion of the amplitude signal range value present at the node of the resistor associated with a particular comparator is greater than the reference voltage associated with that particular comparator, the comparator activates the switch associated therewith, as indicated at process step 220. Activation of a switch allows the resistor communicating therewith to contribute to the resistance of the dampening resistance circuit. However, if the portion of the amplitude signal range value present at the node of the resistor associative with the particular comparator is less than the reference voltage associative with that particular comparator, the switch is left open, as shown at process step 222.

Once all of the comparators have determined the activation status of their associated switches, the dampening process 200 continues to process step 224 by dampening down the peak amplitude of the thermal asperity signal and concludes at end process step 226.

In accordance with one aspect of a preferred embodiment, a present inventive apparatus and associated method for adaptive dampening a peak amplitude of a thermal asperity signal in a disc drive includes the steps of determining a peak-to-peak preamble signal amplitude for use in identifying an amplitude signal range of the peak amplitude of the thermal asperity signal (such as process step 204); measuring the peak amplitude of the thermal asperity signal (such as process step 206); separating the peak-to-peak preamble signal amplitude into substantially even portions for use in calculating a value of the amplitude signal range of the peak amplitude of the thermal asperity signal (such as process step 208); calculating the value of the amplitude signal range of the peak amplitude of the thermal asperity signal for use in determining a dampening resistance for use by a dampening circuit to adaptively dampen the peak amplitude of the thermal asperity signal (such as process step 210); and activating the dampening circuit to dampen the peak amplitude of the thermal asperity signal to minimize the loss of read data integrity (such as process step 224).

Although preferred embodiments have been depicted and described in detail herein, modification, additions, substitutions and the like can be made by those skilled in the relevant art without deviating from the spirit of the invention and are therefore considered to be within the scope of the invention as defined in the appended claims.

What is claimed is:

1. A method for the adaptive dampening of a peak amplitude of a thermal asperity signal in a disc drive to minimize a loss of read data integrity by steps comprising:
   (a) determining a peak-to-peak preamble signal amplitude for use in identifying an amplitude signal range of the peak amplitude of the thermal asperity signal;
   (b) measuring the peak amplitude of the thermal asperity signal;
   (c) separating the peak-to-peak preamble signal amplitude into substantially even portions for use in calculating a value of the amplitude signal range of the peak amplitude of the thermal asperity signal;
   (d) calculating the value of the amplitude signal range of the peak amplitude of the thermal asperity signal for use in determining a dampening resistance for use by a dampening circuit to adaptively dampen the peak amplitude of the thermal asperity signal; and
   (e) activating the dampening circuit to dampen the peak amplitude of the thermal asperity signal.

2. The method of claim 1 wherein the dampening circuit of activating step (e) is activated by steps comprising:
   (e1) applying the value of the amplitude signal range of the peak amplitude of the thermal asperity signal to a plurality of first resistors connected serially at one end of a plurality of comparators for use in consecutively activating a plurality of switches, each of the plurality of switches communicating in series with one of the plurality of comparators, each switch switching in one of a plurality of second resistors to form a dampening resistance;
   (e2) setting a reference signal for each of the plurality of comparators for use in determining activation of each of the plurality of switches;
   (e3) separating equally the value of the amplitude signal range of the peak amplitude of the thermal asperity signal at a node of each of the plurality of first resistors;
   (e4) comparing the separated value of the amplitude signal range of the peak amplitude of the thermal asperity signal with the reference signal for each of the plurality of comparators to determine activation of the switch communicating with the comparator; and
   (e5) switching in each of the plurality of second resistors determined to be activated by each of the plurality of comparators to dampen the peak amplitude of the thermal asperity signal to minimize the loss of read data integrity.

3. The method of claim 1 wherein the dampening resistance of calculating step (d) is a selectable discrete-form of dampening resistance determined by the amplitude signal range calculated in step (d).

4. The method of claim 1 wherein the dampening circuit of calculating step (d) is an adaptive dampening circuit that selectively dampens the peak amplitude of the thermal asperity signal based on a selectable dampening resistance determined by the amplitude signal range determined in calculating step (d).

5. The method of claim 1 wherein the dampening resistance of calculating step (d) is an adaptive dampening resistance wherein the adaptive dampening resistance is in an analogue-form, the resistance of the analogue-form of the adaptive dampening resistance is determined and provided by a semiconductor device.

6. The method of claim 1 wherein the amplitude signal range of separating step (c) is one of a plurality of amplitude signal ranges, the dampening resistance is selected from a plurality of discrete-form dampening resistors and wherein each of the amplitude signal ranges is associated with one of the plurality of discrete-form dampening resistors.

7. The method of claim 5 in which the semiconductor device is an n-channel MOSFET.

8. A disc drive having a basedeck supporting a spindle motor assembly with at least one axially aligned rotatable disc surface, a head stack assembly with at least one magneto-resistive read/write head positionably adjacent the rotatable disc surface providing a signal read from the rotatable disc surface, and a printed circuit board assembly with a read/write channel communicating with the magneto-resistive read/write through a preamplifier, the printed circuit board assembly comprising:

a variable gain amplifier communicating with the preamplifier for adjusting the signal provided by the magneto-resistive read/write head for use by the read/write channel;

a dampening capacitor in parallel with the variable gain amplifier for filtering the signal provided by the magneto-resistive read/write head;

an amplitude range value determined from a baseline signal provided by the magneto-resistive read/write head for use in determining an amount of dampening resistance to apply to the signal provided by the magneto-resistive read/write head;

a plurality of first resistors connected serially and communicating with the amplitude signal range value for use in separating the amplitude signal range value into a plurality of equal amplitude signal portions, to determine the amount of dampening resistance to apply to the signal provided by the magneto-resistive read/write head;

a plurality of comparators, wherein each comparator is connected to one of the plurality of first resistors and used in determining the amount of dampening resistance to apply to the signal provided by the magneto-resistive read/write head;

a plurality of switches each with an attached second resistor, each switch connected in series with its associated second resistor and responding to one of the plurality of comparators to switch in the second resistor in response to a signal from its associated comparator, each switch responding to its associated comparator by switching in its associated second resistor to contribute to an amount of dampening resistance applied to the signal provided by the magneto-resistive read/write head; and a plurality of reference voltages, each of the plurality of reference voltages associated and communicating with one of the plurality of comparators, each of the plurality of comparators comparing its associated reference voltage to one of the equal amplitude signal portions to determine activation of its second resistor to contribute to the amount of dampening resistance applied to the signal provided by the magneto-resistive read/write head to dampen the signal provided by the magneto-resistive read/write head.

9. The disc drive of claim 8 in which each of the plurality of reference voltages has a different voltage value and wherein a first reference voltage value of the plurality of reference voltage values has a voltage value less than a second voltage value and further wherein each successive voltage value has a voltage value greater than its preceding voltage value.

10. The disc drive of claim 8 in which the signal provided by the magneto-resistive read/write head is a peak amplitude of a thermal asperity signal.

11. The disc drive of claim 10 wherein dampening the peak amplitude of the thermal asperity signal comprises:

(a) determining a peak-to-peak preamble signal amplitude for use in identifying an amplitude signal range of the peak amplitude of the thermal asperity signal;

(b) measuring the peak amplitude of the thermal asperity signal to be dampened;

(c) separating the peak-to-peak preamble signal amplitude into substantially even portions for use in calculating a value of the amplitude signal range of the peak amplitude of the thermal asperity signal;

(d) calculating the value of the amplitude signal range of the peak amplitude of the thermal asperity signal for use in determining a dampening resistance for use by a dampening circuit to adaptively dampen down the peak amplitude of the thermal asperity signal; and (e) activating the dampening circuit to dampen the peak amplitude of the thermal asperity signal.

12. The disc drive of claim 11 wherein dampening circuit of (e) dampens the peak amplitude by:

(e1) applying the value of the amplitude signal range of the peak amplitude of the thermal asperity signal to a plurality of first resistors connected serially at one end of a plurality of comparators for use in consecutively activating a plurality of switches, each of the plurality of switches communicating in series with one of the plurality of comparators, each switch switching in one of a plurality of second resistors to form a dampening resistance;

(e2) setting a reference signal for each of the plurality of comparators for use in determining activation of each of the plurality of switches;

(e3) separating equally the value of the amplitude signal range of the peak amplitude of the thermal asperity signal at a node of each of the plurality of first resistors connected serially;

(e4) comparing the separated value of the amplitude signal range of the peak amplitude of the thermal asperity signal with the reference signal for each of the plurality of comparators to determine activation of the switch communicating with the comparator; and (e5) switching in each of the plurality of second resistors determined to be activated by each of the plurality of comparators to dampen the peak amplitude of the thermal asperity signal.

13. A disc drive having a basedeck supporting a spindle motor assembly with at least one axially aligned rotatable disc surface, a head stack assembly with at least one magneto-resistive read/write head positionably adjacent the rotatable disc surface providing a signal read from the rotatable disc surface, and a printed circuit board assembly with a read/write channel communicating with the magneto-resistive read/write through a preamplifier, the printed circuit board assembly comprising:

a variable gain amplifier communicating with the preamplifier for adjusting the signal provided by the magneto-resistive read/write head for use by the read/write channel;

a dampening capacitor in parallel with the variable gain amplifier for filtering the signal provided by the magneto-resistive read/write head; and an n-channel enhancement metal on silicon field effect transistor attached in parallel with the dampening capacitor provide a dampening resistance for dampening down the signal provided by the magneto-resistive read/write head by steps for dampening the signal provided by the magneto-resistive read/write head.

14. The disc drive of claim 13 in which the signal provided by the magneto-resistive read/write head is a peak amplitude of a thermal asperity signal.

15. The disc drive of claim 14 in which the steps for dampening the peak amplitude of the thermal asperity signal are steps comprising:

(a) determining a peak-to-peak preamble signal amplitude for use in identifying an amplitude signal range of the peak amplitude of the thermal asperity signal;

(b) measuring the peak amplitude of the thermal asperity signal to be dampened;

(c) separating the peak-to-peak preamble signal amplitude into substantially even portions for use in calculating a value of the amplitude signal range of the peak amplitude of the thermal asperity signal;

(d) calculating the value of the amplitude signal range of the peak amplitude of the thermal asperity signal for use in determining a dampening resistance for use by a dampening circuit to adaptively dampen down the peak amplitude of the thermal asperity signal; and (e) activating the dampening circuit to dampen down the peak amplitude of the thermal asperity signal to minimize the loss of read data integrity.

* * * * *